United States Patent
Meredith et al.

(10) Patent No.: US 9,942,770 B2
(45) Date of Patent: *Apr. 10, 2018

(54) DETECTION AND BLOCKING OF CLONED MOBILE DEVICES

(71) Applicants: AT&T Mobility II LLC, Atlanta, GA (US); AT&T Intellectual Property I, L.P., Atlanta, GA (US)

(72) Inventors: Sheldon Kent Meredith, Marietta, GA (US); William Cottrill, Canton, GA (US); Brandon B. Hilliard, Canton, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,522

(22) Filed: Jan. 24, 2017

(65) Prior Publication Data

US 2017/0134958 A1 May 11, 2017

Related U.S. Application Data

(63) Continuation of application No. 14/549,527, filed on Nov. 20, 2014, now Pat. No. 9,572,036.

(51) Int. Cl.
*H04W 12/12* (2009.01)
*H04L 29/06* (2006.01)
(Continued)

(52) U.S. Cl.
CPC .......... *H04W 12/12* (2013.01); *H04L 61/605* (2013.01); *H04L 63/101* (2013.01); *H04M 15/41* (2013.01);
(Continued)

(58) Field of Classification Search
CPC ..... H04W 12/06; H04W 12/08; H04W 12/12; H04W 36/0038; H04W 8/04; H04W 4/025; H04M 15/47; H04M 1/66; H04M 7/0078
See application file for complete search history.

(56) References Cited

U.S. PATENT DOCUMENTS 5,335,265 A  8/1994 Cooper et al.
5,335,278 A  8/1994 Matchett et al.
(Continued)

FOREIGN PATENT DOCUMENTS

EP           822726 A2    2/1998
WO       WO 9641488      12/1996
(Continued)

*Primary Examiner* — Daniel Lai

(57) ABSTRACT

A method is disclosed for blocking a cloned mobile device by a processor of a network. The processor receives a first registration from a first mobile device at a first location. The first registration includes a device identifier and a phone number. The processor then confirms that a second registration from a second mobile device at a second location includes the device identifier and the phone number and calculates a first fraud score for the first mobile device and a second fraud score for the second mobile device. The processor then determines that the second mobile device is the cloned mobile device, when the second fraud score exceeds the first score, and blocks the cloned mobile device from registering on the network.

20 Claims, 3 Drawing Sheets

(51) Int. Cl.
*H04W 12/06* (2009.01)
*H04W 8/04* (2009.01)
*H04L 29/12* (2006.01)
*H04W 4/02* (2018.01)
*H04M 15/00* (2006.01)
*H04W 12/08* (2009.01)

(52) U.S. Cl.
CPC ............ *H04W 4/025* (2013.01); *H04W 8/04* (2013.01); *H04W 12/06* (2013.01); *H04W 12/08* (2013.01)

(56) References Cited

U.S. PATENT DOCUMENTS

| | | |
|---|---|---|
| 5,345,595 A | 9/1994 | Johnson et al. |
| 5,608,781 A | 3/1997 | Selderman |
| 5,655,004 A | 8/1997 | Holbrook |
| 5,799,249 A | 8/1998 | Kennedy et al. |
| 5,918,173 A | 6/1999 | Rosa |
| 5,950,121 A | 9/1999 | Kaminsky et al. |
| 5,956,634 A | 9/1999 | Otterson et al. |
| 5,978,669 A | 11/1999 | Sanmugam |
| 6,085,083 A | 7/2000 | Lamb |
| 6,097,938 A | 8/2000 | Paxson |
| 6,157,825 A | 12/2000 | Frederick |
| 6,161,006 A | 12/2000 | Balachandran |
| 6,370,373 B1 | 4/2002 | Gerth et al. |
| 6,397,056 B1 | 5/2002 | Bugnon |
| 6,466,777 B1 | 10/2002 | Urita |
| 7,266,364 B2 | 9/2007 | Itoh |
| 7,995,991 B2 | 8/2011 | Johnson et al. |
| 8,559,926 B1 | 10/2013 | Zang |
| 2004/0038666 A1 | 2/2004 | Lohtaja |
| 2007/0072587 A1 | 3/2007 | Della-Torre |
| 2011/0151865 A1 | 6/2011 | Lau |
| 2015/0038120 A1 | 2/2015 | Larkin |

FOREIGN PATENT DOCUMENTS

| | | |
|---|---|---|
| WO | WO 9857514 | 12/1998 |
| WO | WO 9957843 | 11/1999 |
| WO | WO 2010067342 | 6/2010 |
| WO | WO 2014081646 | 5/2014 |

DETECTION AND BLOCKING OF CLONED MOBILE DEVICES

This application is a continuation of U.S. Ser. No. 14/549,527, filed Nov. 20, 2014, now U.S. Pat. No. 9,572,036, which is herein incorporated by reference in its entirety.

The present disclosure relates generally to methods and apparatus for determining unauthorized usage of cloned devices and subscribers' credentials in a network and automatically preventing such unauthorized usage.

BACKGROUND

A current problem for network operators and subscribers is that devices in the network are being cloned, e.g., where serial numbers and telephone numbers are being copied and used by an unauthorized device. When an unauthorized device registers with the network at a particular location, the legitimate device in a different location might be erroneously deregistered. The network usage by the unauthorized device may also appear as charges on the legitimate subscriber's bill. The network operator will typically remove such charges when the network operator is able to confirm that the charges were incurred by the unauthorized device. However, the network operator is still providing unpaid network usage to the cloned device. In addition, the network operator must assign customer care agents to handle subscriber complaints, at further cost to the network operator. The legitimate subscriber may still come away dissatisfied after having to prove that he or she did not incur the charges and after having service disrupted when the unauthorized device obtains registration on the network. Thus, cloned devices remain a significant problem to network operators.

SUMMARY

In one embodiment, the present disclosure discloses a method, computer-readable medium and apparatus for blocking a cloned mobile device by a processor of a network. For example, the processor receives a first registration from a first mobile device at a first location. The first registration includes a device identifier and a phone number. The processor then confirms that a second registration from a second mobile device at a second location includes the device identifier and the phone number and calculates a first fraud score for the first mobile device and a second fraud score for the second mobile device. The processor then determines that the second mobile device is the cloned mobile device, when the second fraud score exceeds the first score, and blocks the cloned mobile device from registering on the network.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
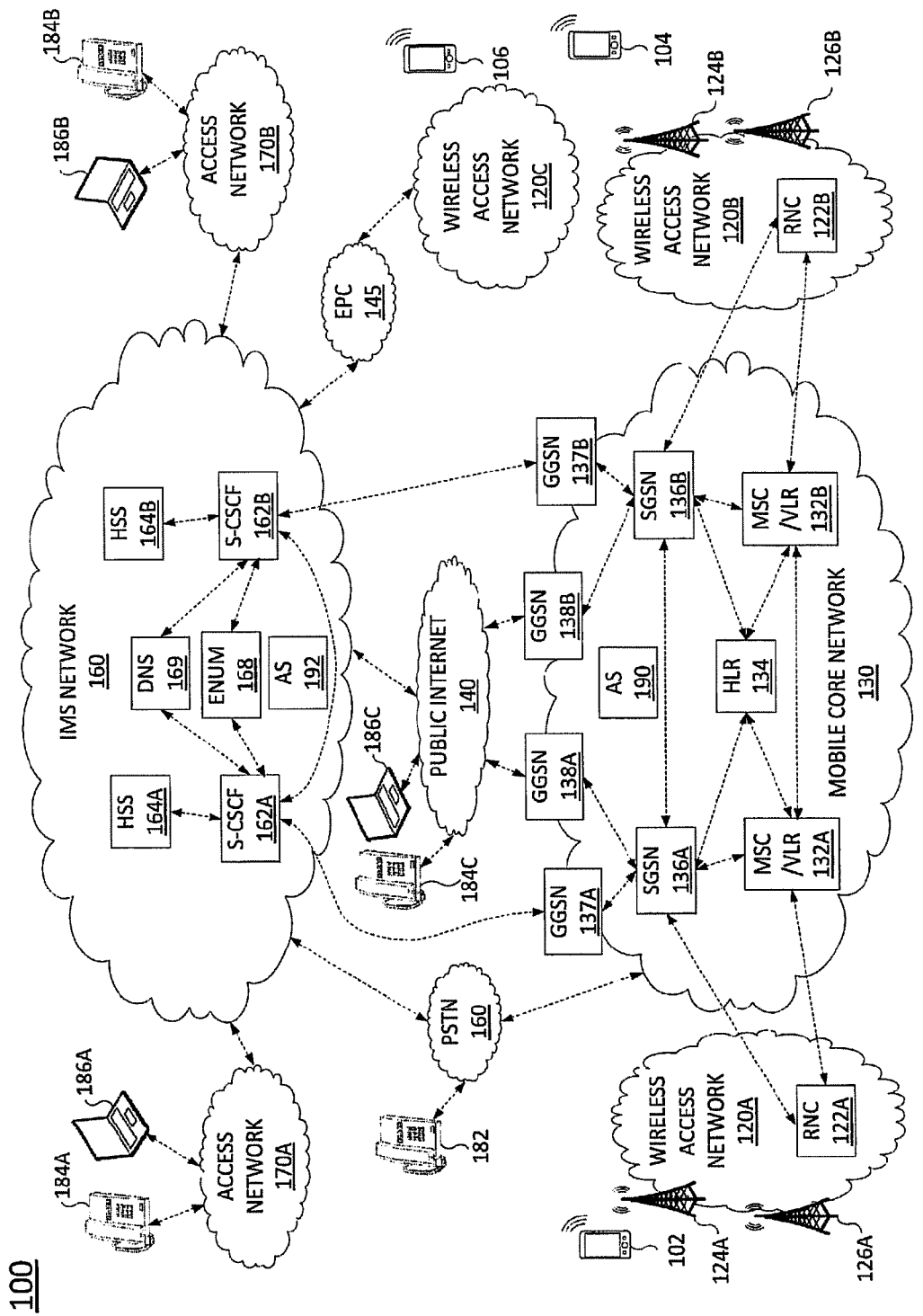
FIG. 1 illustrates an example system related to the present disclosure.

The present disclosure broadly discloses methods, computer-readable media and apparatuses for blocking a cloned mobile device. In particular, embodiments of the present disclosure automatically detect cloned mobile devices on the network, correct associated billing records, prevent continued fraudulent usage, and contact the legitimate device owners to perform corrective actions. In one example, detection of the fraudulent usage is based upon several factors including device location, known billing address, asserted home address, travel speed estimation, and/or historical usage information.

For instance, if a mobile device is in use in the city of Philadelphia and five minutes later the same device is allegedly detected being used in the city of Atlanta, then it is determined that the travel speed necessary for this use scenario to be valid is extremely unlikely. Thus, this use scenario is immediately flagged as a potential detection of a cloned mobile device. Thereafter, it is determined which observed mobile device is likely to be the legitimate mobile device versus the cloned mobile device.

For example, if the historical home, work, and weekend locations for the legitimate, or authorized mobile device are known, and if one of the current location observations is in one of those known areas, then it is the more likely location of the authorized mobile device. Thus, if device A is for a subscriber who works in the city of Denver and the system detects device A in Denver while another allegedly same device B is simultaneously registered in the city of Miami, then the mobile device in Miami is more suspect, i.e., the device B is suspected as being a cloned device passing itself off as device A. Similarly, if it is also known that device A is typically used for making calls to local phone numbers near Denver and is rarely, if ever, used for international calls, when a current observation is that device A is calling a number in Denver while device B is calling Russia, this makes the device B even more suspicious. The degree of suspicion is reflected in a fraud score and when the score difference between two devices is sufficiently large, then the device with the greater fraud score, e.g., device B, is determined to be a cloned mobile device, and corrective steps are then implemented.

In one example, billing records associated with the fraudulent usage of device B are removed from the billing records for the legitimate subscriber of device A. This stops the subscriber of device A from having to contact customer care to dispute the bill which would otherwise show fraudulent calls made to Russia. In one example, the authorized mobile device may also be automatically contacted via a mobile switching center (MSC) covering the legitimate device with instructions to take the device to a store where the SIM card can be changed out. Knowledge about which device is a clone mobile device can also be used to dump the cloned mobile device from a visiting location register (VLR) and add the cloned mobile device to a blacklist for that VLR to ensure that the cloned device cannot re-register there. This VLR-based blacklisting may apply only for a finite time, in the event that the authorized mobile device travels to that same location. This could alternatively be handled as a restriction in a home location register (HLR). In addition, similar operations may be implemented with respect to a home subscriber server (HSS) in an Internet Protocol Multimedia Subsystem (IMS) network, as described in greater detail below.

To better understand the present disclosure, FIG. 1 illustrates an example network, or system 100 (e.g., a network having an integrated cellular network architecture), suitable for implementing embodiments of the present disclosure for detecting and/or blocking a cloned mobile device. In particular, system 100 includes example wireless access networks 120A and 120B, and a mobile core network 130 (e.g., a public land mobile network (PLMN)-universal mobile telecommunications system (UMTS)/General Packet Radio Service (GPRS) core network). In one embodiment, each of the wireless access networks 120A and 120B is connected to the mobile core network 130 to provide an integrated cellular network architecture (e.g., a cellular network architecture that includes multi-generational protocols and technologies).

Wireless access networks 120A and 120B may each comprise a radio access network implementing such technologies as: global system for mobile communication (GSM), e.g., a base station subsystem (BSS), GSM enhanced data rates for global evolution (EDGE) radio access network (GERAN), or IS-95, among others, or a UMTS terrestrial radio access network (UTRAN) network, e.g., employing wideband code division multiple access (WCDMA), or a CDMA2000, among others. In other words, wireless access networks 120A and 120B may comprise networks in accordance with any "second generation" (2G) or "third generation" (3G) network technology. Thus, base stations 124A, 126A and 124B, 126B may each comprise a base transceiver station (BTS) or a NodeB. In one example, wireless access networks 120A and 120B may further include radio network controllers (RNCs) 122A and 122B (alternatively referred to as base station controllers (BSCs) in 2G terminology) for managing RF communication of the base stations 124A, 126A and 124B, 126B respectively. RNCs 122A and 122B may perform a variety of wireless network management related tasks such as wireless channel assignments, determining transmission power levels, controlling handovers from one base station to another base station, concentrating multiple signals from mobile endpoint devices for onward transmission to other portions of the respective wireless access networks 120A and 120B, or mobile core network 130, and to perform other functions.

Each of wireless access network 120A and 120B may interface with the mobile core network 130 of system 100 to facilitate communications for various endpoint devices, including mobile devices 102, 104, and 106, each of which may comprise a cellular telephone, a smartphone, a tablet computing device, a laptop computer, a pair of computing glasses, or any other cellular-capable mobile telephony and computing device (broadly, "mobile endpoint devices").

In one embodiment, mobile core network 130 includes components of a public land mobile network (PLMN). For example, mobile core network 130 may include one or more mobile switching centers (MSCs) 132A and 132B for each wireless access network that forms part of the system 100. The mobile core network 130 may further include one or more home location registers (HLRs), such as HLR 134, which functions as a central repository of authentication and service validation information, subscription information, and other information pertaining to user subscriptions and services. Similarly, respective visiting location registers (VLRs) may be integrated within each MSC 132A and 132B, which function as temporary repositories of authentication and service validation information, subscription information, and other information pertaining to visiting user subscriptions and services when a user's mobile device is located in a particular geographic region serviced by a particular MSCNLR. For example, MSC 132A may be designated to serve and administer a first coverage area including wireless access network 120A. Thus, MSC 132A may maintain, e.g., in a visiting location register (VLR), user profile records for mobile devices currently serviced by base stations within the portion of the network that is the responsibility of MSC 132A (e.g., mobile device 102). Similarly, MSC 132B may be designated to administer a second coverage area that includes wireless access network 120B and to perform similar functions to those provided by MSC 132A.

Mobile core network 130 may also include GPRS network elements for handling data calls to and from mobile devices. Such network elements may include serving GPRS support nodes (SGSNs) 136A and 136B, gateway GPRS support nodes (GGSNs) 137A, 138A, 137B, and 138B, and related support components including media servers, application servers, and the like. An SGSN refers to a network node responsible for communicating with mobile devices and routing of data calls. Similar to MSCs 132A and 132B, SGSNs 136A and 136B may have specific coverage areas and be assigned to handle specific wireless access networks of the system 100. A GGSN refers to a network node responsible for the interworking between a GPRS network (e.g., components of core network 130 that support GPRS services and functionality) and external packet switched networks, e.g., the public Internet 140, IMS network 160, and other networks.

In general, in a $3^{rd}$ generation partnership project (3GPP) network, the setup of a data call may be summarized as follows. A mobile device requests connectivity to an external network or service by providing a corresponding Access Point Name (APN) to the GRPS cellular network architecture. During the Packet Data Protocol (PDP) Context activation phase for a mobile device (e.g., a cellular device, such as any of mobile devices 102, 104, and 106), the SGSN serving the mobile cellular device performs a DNS lookup to determine which GGSN(s) are configured for serving the requested APN for the mobile cellular device. The APN for a large external network may be mapped to a number of GGSNs, while a small external network may only be mapped to a single GGSN. GGSN mapping can also be based on load or mobile cellular device location during this process to improve data service quality. The identities of the mapped GGSN or GGSNs are then returned to the SGSN and the SGSN selects one to create a new PDP Context for the mobile device. In the case of IP network access, at the end of the PDP Context activation process, the mobile device also receives its IP address.

The mobile core network 130 may also include, in one embodiment, an application server (AS) 190. In one embodiment, AS 190 may comprise a computing system, such as computing system 300 depicted in FIG. 3, and may be configured to provide one or more functions for blocking a cloned mobile device, e.g., according to the method 200 depicted in FIG. 2 and described below. Accordingly, the AS 190 may be connected directly or indirectly to any one or more network elements of mobile core network 130, and of the system 100 in general, that are configured to gather and forward network traffic data and other information and statistics to AS 190 and to receive instructions from AS 190. Due to the relatively large number of connections available between AS 190 and other network elements, none of the actual links to the application server are shown in FIG. 1.

In one example, system 100 may further include an IP multimedia subsystem (IMS) network 160. For instance, IMS network 160 may provide VoIP services to users connecting via access networks 170A and 170B which may comprise a Digital Subscriber Line (DSL) network, a broadband cable access network, a Local Area Network (LAN), a metropolitan area network (MAN), an enterprise network, or other "trusted access network". The access networks 170A and 170B may be either directly connected to IMS network 160, or indirectly through one or more other networks.

IMS network 160 may also be responsible for routing voice and data calls from cellular networks. For example, calls may enter the IMS network 160 from wireless access network 120C via evolved packet core (EPC) 145, or from wireless access networks 120A and 120B via mobile core network 130. In particular, wireless access network 120C may comprise an evolved UTRAN (eUTRAN) that utilizes IMS network 160 for both voice and data call routing via an all-IP infrastructure.

Notably, mobile core network 130 may be fully equipped to route a voice or data call without invoking IMS network 160. However, in one example, traversal of IMS network 160 may be required to reach a VoIP user via access network 170A or access network 170B, e.g., endpoint devices 184A, 186A, 184B, and 186B respectively, or a 4G cellular user who is on an eUTRAN, e.g., mobile device 106 on wireless access network 120C. For instance, endpoint devices 184A and 184B may comprise Session Initiation Protocol (SIP)-enabled VoIP phones, whereas endpoint devices 186A and 186B may comprise personal computer, laptop computers, and the like, which may be referred to as "softphones." In another example, additional services may be obtained for cellular users on wireless access networks 120A and 120B via the IMS network, e.g., "VoIP over 3G" services, media services, and so forth.

In one example, access networks 120A and 120B and mobile core network 130 may provide 2G/3G fallback coverage in the event that a 4G/LTE access network is not available, or in the event that a mobile device is not 4G/LTE capable. As such, mobile devices may be registered with both IMS network 160 as well as with cellular core network 130. In this regard, it should be noted that EPC 145 and mobile core network 130 are illustrated as separate networks in FIG. 1. However, in another embodiment mobile core network 130 and evolved packet core (EPC) 145 may comprise a single integrated mobile core network for supporting features of 2-4G access networks, as well as any access network that may utilize still to be deployed or developed technologies. As such, in one example wireless access networks 120A, 120B, and 120C, mobile core network 130, EPC 145 and IMS network 160 (as well as access networks 170A and 170B) may all be controlled by a single network operator.

A first portion of IMS network 160 includes a Home Subscriber Server (HSS) 164A and a Serving-Call Session Control Function (S-CSCF) 162A. A second portion of IMS network 160 includes HSS 164B and S-CSCF 162B. A number of shared resources are also present within IMS network 160: an ENUM (tElephone NUmbering Mapping) server 168, a domain name service (DNS) server 169 and an Application Server (AS) 192.

An HSS refers to a network element residing in the control plane of the IMS network that acts as a central repository of all customer specific authorizations, service profiles, preferences, etc., with respect to both "home" users and "visiting" users who are temporarily present within a coverage area assigned to a particular HSS. The HSS may also perform user/endpoint device location tracking. Thus, HSS 164A and HSS 164B may store information relating to VoIP users utilizing access networks 170A, 170B as well as cellular users utilizing access networks 120A, 120B and/or 120C. HSS 164A and HSS 164B may also communicate with one another to confirm authorizations and to obtain user/subscriber records to service visiting users. In addition, as mentioned above, mobile devices may be registered with both IMS network 160 as well as with cellular core network 130. Accordingly, HSS 164A and HSS 164B may be configured to receive updates from HLR 134 regarding endpoint device locations and registrations, and vice versa.

S-CSCFs 162A and 162B reside within the IMS core infrastructure and are connected to various network elements in the IMS network 160 using the Session Initiation Protocol (SIP) over the underlying IMS based core backbone network. S-CSCFs 162A and 162B may be implemented to register users, perform routing and maintain session timers, e.g., for VoIP services. For example, each S-CSCF may also interrogate an HSS to retrieve authorization, service information, user profiles, etc. As illustrated S-CSCF 162A may be configured to utilize HSS 164A, while S-CSCF 162B may be configured to utilize HSS 164B. In addition, S-CSCF 162A and HSS 164A may be delegated a first coverage area while S-CSCF 162B and HSS 164B may be delegated a second coverage area. In one example, these areas may wholly or partially overlap with areas of coverage of mobile core network 130, e.g., the areas assigned to MSC 132A/SGSN 136A and MSC 132B/SGSN 136B, respectively.

In order to complete a call, the S-CSCF may need to interact with ENUM server 168 and DNS server 169 for translating of an E.164 voice network address into an IP address, for example. E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix. ENUM refers to a standard protocol defined by the Internet Engineering Task Force (IETF) for translating phone numbers that are in E.164 format to Internet domain names such that a DNS server may resolve the IP addresses for E.164 numbers the same way it resolves traditional website domains. For example, ENUM may be used to transform a phone, a fax or a pager number into a URI (Uniform Resource Identifier).

To illustrate, S-CSCF 163A may translate an original USA phone number of 987-555-1234 to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

ENUM server 168 may then be queried by the S-CSCF 162A to resolve on the domain name 4.3.2.1.5.5.5.7.8.9.1.e164.arpa. For each E.164 number that is registered, there may be multiple entries in ENUM server 168 comprising NAPTR (Naming Authority Pointer) resource records, e.g., SIP URIs, which may correspond to a SIP address, a telephone number, a presence service number, an email address, etc.

Each NAPTR resource record contains information pertaining to an order and a preference. In one embodiment, the NAPTR resource records for a particular E.164 number are organized based on the order field and the preference field, e.g., from a lowest order value to a highest order value and from a lowest preference value to a highest preference value. This approach allows a call to be directed to a plurality of possible destinations based upon a preferred order or sequence that can be selectively set by the user.

Furthermore, in one embodiment, each NAPTR resource record may also have an activation field that indicates whether a NAPTR resource record is "active" or "inactive." An "active" field indicates that the NAPTR resource record can be used, whereas an "inactive" field indicates that the NAPTR resource record should not be used. Thus, this approach allows a user to selectively activate or deactivate a NAPTR resource record.

After retrieving one or more NAPTRs from the ENUM server 168, S-CSCF 162A may then query DNS server 169 for the regular routing of the contact information resided in the NAPTR (Naming Authority Pointer) resource records, e.g., the SIP URI. In sum, after querying HSS 164A and performing the steps of authentication, authorization, and so forth, the S-CSCF 162A will send the ENUM query and the ENUM server 168 will return the NAPTR resource records if the E.164 number is registered, where the S-CSCF 162A then queries the DNS server 169 for the destination of the returned records, e.g., an IP address corresponding to the SIP URI. S-CSCF 162A may then route the call to another S-CSCF or to another network as indicated by the IP address.

In one embodiment, AS 192 may comprise a computing system, such as computing system 300 depicted in FIG. 3, and may be configured to provide one or more functions for blocking a cloned mobile device, e.g., according to the method 200 depicted in FIG. 2 and described below. Accordingly, the AS 192 may be connected directly or indirectly to any one or more network elements of IMS network 160, mobile core network 130, and of the system 100 in general, that are configured to gather and forward network traffic data and other information and statistics to AS 192 and to receive instructions from AS 192. Due to the relatively large number of connections available between AS 192 and other network elements, none of the actual links to the application server are shown in FIG. 1. In addition, AS 192 may perform the same or substantially similar functions to those of AS 190. In one example, AS 190 and AS 192 may cooperate to perform various aspects of the present disclosure in a distributed manner.

Each of mobile core network 130 and IMS network 160 may also interface to a public-switched telephone network (PSTN) 160, to enable communications with PSTN endpoints, e.g., endpoint device 182, and public Internet 140, to enable communications with devices accessible via the Internet, e.g., endpoint devices 184C, 186C, which may comprise a VoIP phone and a softphone, respectively. For example, VoIP users who are not subscribers of IMS network 160 or who are not on a "trusted access network" may nevertheless send and receive calls involving VoIP endpoint devices of access networks 170A and 170B and/or mobile endpoint devices on wireless access networks 120A, 120B, and 120C via the public Internet 140.

The foregoing description of an integrated cellular network architecture of system 100 is provided as an illustrative example only. In other words, the embodiment of system 100 is merely illustrative of one network configuration that is suitable for implementing embodiments of the present disclosure. As such, other logical and/or physical arrangements for the system 100 may be implemented in accordance with the present disclosure. For example, network components, such as MSCs 132A and 132B, may be included in respective wireless access network portions (e.g., wireless access networks 120A and 120B) instead of being deployed within the mobile core network 130, or in other portions of system 100 that are not shown, while providing essentially the same functionality. As another example, DNS server 169 may reside in mobile core network 130 or may comprise a public DNS server hosted by another entity on the public Internet 140. Similarly, system 100 may comprise multiple DNS servers, multiple ENUM servers, and so forth. Thus, these and other modifications are all contemplated within the scope of the present disclosure.

In addition, various elements of wireless access networks 120A, 120B, and 120C, EPC 145, mobile core network 130 and IMS network 160 are omitted for clarity, including gateways or border elements providing connectivity between such networks. Similarly, mobile core network 130 and IMS network 160 may each run atop an Internet Protocol/Multi-Protocol Label Switching IP/MPLS network infrastructure, the details of which are also omitted from FIG. 1.

Figure 2:
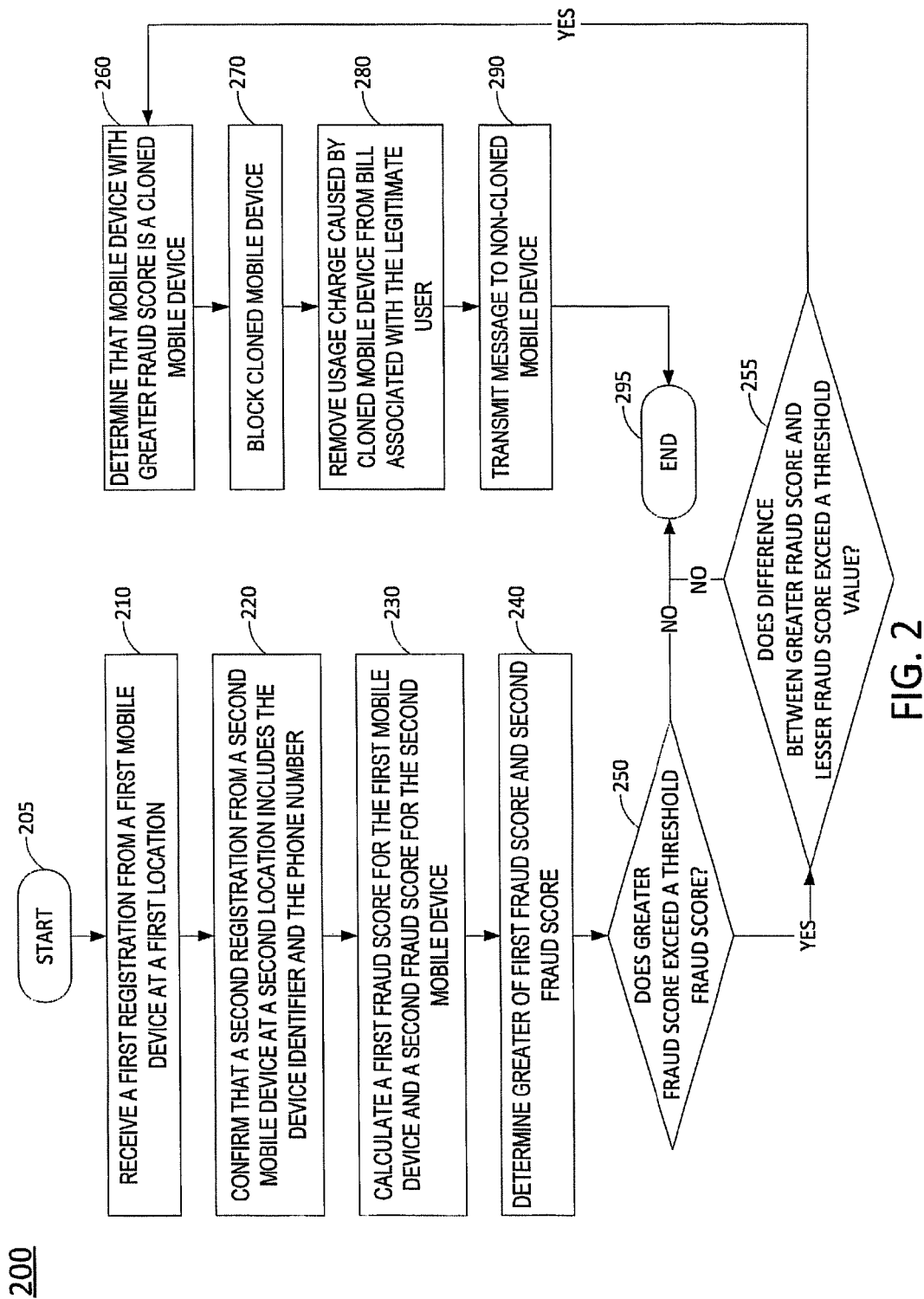
FIG. 2 illustrates a flowchart of a method for blocking a cloned mobile device according to the present disclosure.

FIG. 2 illustrates a flowchart of a method 200 for detecting and/or blocking a cloned mobile device. In one embodiment, the steps, operations or functions of the method 200 may be performed by any one or more of the components of the system 100 depicted in FIG. 1. For example, in one embodiment, the method 200 is performed by application server 190. In another embodiment, the method 200 is performed by application server 192, or is performed by application servers 190 and 192 in a distributed manner and in coordination with one another. Alternatively, or in addition, one or more steps, operations or functions of the method 200 may be implemented by a computing device having a processor, a memory and input/output devices as illustrated below in FIG. 3, specifically programmed to perform the steps, functions and/or operations of the method. Although any one of the elements in IMS network 160 or mobile core network 130 may be configured to perform various steps, operations or functions of the method 200, the method will now be described in terms of an embodiment where steps of the method are performed at a server, such as application server 192 in FIG. 1.

The method 200 begins in step 205 and proceeds to step 210. In step 210, the processor receives a first registration from a first mobile device at a first location. In one example, the first registration includes at least one device identifier such as an electronic serial number (ESN), a mobile equipment identifier (MEID), an integrated circuit card identifier (ICCID), an international mobile equipment identity (IMEI) or an international mobile subscriber identity (IMSI), and a telephone number, e.g., an E.164 number or a number that is translatable into E.164 format. In one example, the device identifier may be obtained from a subscriber identity module (SIM) card of the first mobile device. In one example, the first registration may be received via one or more other network elements such as gateways/border elements, a P-CSCF, an S-CSCF, an MSC, and so forth. For instance, the method 200 may be performed by an application server or a processor of an application server that does not actually perform device registrations. Thus, the registration may be received as a copy from one or more other network elements that are actively involved in the forwarding and the processing of the registration. The location may be contained explicitly within the registration, e.g., global positioning system (GPS) location information included in the first registration by the first mobile device, serving base station information that is appended to the first registration by the base station or an MSC, and so forth, or may be inferred based upon the route taken by the registration and the network device(s) from which the registration is received.

At step 220, the processor confirms that a second registration from a second mobile device at a second location includes the same at least one device identifier and telephone number as the first registration. In one example, the first registration may be received from mobile device 102 in FIG. 1, while the second registration may be received from mobile device 104. In one example, at step 220, a plurality of device identifiers may be matched in the first registration and the second registration. Notably, one of the first registration and the second registration may be from a cloned mobile device (e.g., mobile device 104), which may be determined via subsequent steps of the method 200. However, at step 220, the processor may not yet be aware of, or have reached the conclusion that there are two mobile devices involved. Thus, for the second registration, the device identifier may be obtained from a subscriber identity module (SIM) card of the second mobile device, but could also be fraudulently inserted in the second registration using a different mechanism.

It should be noted that the second registration may be received at any time before, during or after the first registration is received. In addition, the second registration may be received via one or more other network elements. However, in one example, the method 200 is only concerned with when the first registration message and the second registration are received within a threshold period of time, e.g., within the same hour, within a three-hour period, within a same day, etc. For instance, if a legitimate user (e.g., a subscriber) is travelling, the user may very well turn off the mobile device for a flight, turn it back on at the destination city, and register for service via a portion of the network in the new city. Thus, two registrations close together in time and further apart geographically are more likely to involve a fraudulent registration as compared to two registrations from different geographic areas that are received further apart in time.

At step 230, the processor calculates a first fraud score for the first mobile device and a second fraud score for the second mobile device. For example, a fraud score may take into account one or several features that may be indicative that a registration involves a fraudulent cloned mobile device. In one embodiment, a factor may comprise whether or not the registration is received from a home location associated with the telephone number. For instance, when a legitimate user signs-up for service, a telephone number that is local to the user's home area may be assigned and may be added to a home location register (HLR) and/or a home subscriber server (HSS) with an assigned coverage area that includes the user's home area. Thus, if a registration is received from somewhere other than the home area, the fraud score may be increased. In one example, the further away from the home area from which the registration is received, the greater the fraud score is increased. As such, step 230 may involve calculating a distance from the location from which a registration is received to a home location, and applying a weighting factor the distance to produce a weighted value that is added to the fraud score.

Another factor may comprise a time between two registrations. For instance, if a phone is turned off for several weeks while the user has travelled out of the country, and is turned back on when the user arrives at a layover stop, a registration may be received from a location that is not typically associated with the telephone number. However, given that the last registration and the last known location may have been more than a week old, this may be considered to be less likely a fraud as compared to a registration that is closer in time to a previous registration.

Still another factor may comprise whether or not the registration is received from at or near a location of previous usage associated with the telephone number and/or the at least one device identifier (broadly referred to herein as "credentials"). For example, based upon call detail records (CDR) and the like, previous locations associated with the credentials may be determined. For instance, the legitimate user may be a regular traveler from his or her home in New York City to a visiting location in San Francisco. Thus, records of the legitimate user's usage may indicate time spent in or near both cities. As such, if a registration is received from San Francisco, the fraud score may not be increased, or may be increased by a smaller amount. On the other hand, if the registration is received from anywhere that is not included in a set of previous locations, the fraud score may be increased, or may be increased by a greater amount. In one example, locations that are near to one of the previous locations may also result in no increase to the fraud score or only a small increase to the fraud score. For instance, if the user often travels to San Francisco and a registration is received from San Jose, this may be consider to be less likely an instance of a cloned device and more likely that the user has flown to a different airport or has taken a short trip outside of San Francisco. As such, step 230 may involve calculating a distance from the location from which a registration is received to the one or more previous locations.

Another factor may comprise whether or not the location from which the registration was received is a legitimate location based upon a last known location associated with the credentials. For instance, an authorized mobile device may be carried by the legitimate user when travelling along a highway from New York to Philadelphia. The locations and movement may be revealed with high accuracy by GPS coordinates reported to the network by the mobile device, or by simply tracking the base stations to which the mobile device is connecting along the route. At some point, tracking of the location of the mobile device may be lost. This could be due to a lack of signal coverage, a drained battery, and so forth. An hour later, a registration utilizing the same credentials could be received from Houston, San Francisco or a similarly far off location. If it is implausible for the mobile device to have travelled from the Philadelphia area to Houston or San Francisco so quickly, then the fraud score may be increased. For instance, a maximum speed of a commercial airliner may be applied to a geographic distance from the last known location to the location from which the new registration is received to determine an absolute minimum period of time that it would take for a mobile device to realistically be transported to the location associated with the new registration. On the other hand, if a registration is received two hours later in the Baltimore area, this may be considered to be less likely a registration from a cloned mobile device, since a car travelling near Philadelphia may realistically reach the Baltimore area within a few hours. As such, the fraud score may not be increased, or may only be increased a smaller amount.

Another factor may be based upon a calculated trajectory associated with the telephone number, or the credentials of the user. For instance, a distance and a direction from a last known location to the location associated with the registration may be determined and compared to the previously tracked velocity and direction of travel. In one example, a plurality of potential locations or one or more zones of potential location are calculated based upon the last know location and the direction and velocity of travel. To illustrate, the authorized mobile device may be registered and is being tracked as travelling southwest approximately 65 miles per hour between New York City and Philadelphia. If the location tracking is lost and a new registration is received two hours later in Baltimore (where a motor vehicle could easily reach), this may be considered as likely a registration from the authorized mobile device. On the other hand, if two hours later there is a registration received from Connecticut (to the northeast), while it is possible for a motor vehicle to make this trip from the last tracked location, it is less likely considering that the previous trajectory was southwest at 65 miles per hour. As such, the fraud score may be increased when the location of the registration and or a current trajectory does not match with the previous trajectory.

It should be noted that a fraud score may be calculated as a composite score based upon one or more weighted factors. However, in one embodiment, one or more factors may comprise binary rules. For instance, in one embodiment, if a registration is received from a home location, a fraud score of zero may be assigned regardless of any other factors. Thus, if a usage associated with the credentials was most recently tracked in a different area, a factor that compares the location from which a registration was received with a last known location associated with the credentials may call for increasing the fraud score. Nevertheless, since the registration is from the home area, the fraud score will not be increased. In other words, any usage at or near to the home location may be considered to override any other factors that may increase a fraud score.

It should be noted that in one example, it may be assumed that one or the other device is an authorized device, where the fraud score is only calculated for a suspected cloned mobile device. For instance, to evaluate the likelihood that a location of a registration is plausible, the previous trajectory and last known location must be tracked and it must be assumed that this trajectory and location are associated with the authorized device. Otherwise, the authorized device could be given an increased fraud score simply because it was registered later on the network and its current location does not match with the location and trajectory of the cloned mobile device. Thus, as mentioned above, a registration from a home location may be assumed to be that of an authorized mobile device (e.g., with an assigned fraud score of zero), where any registration from outside the home location is subject to the present analysis to determine whether it is from a clone mobile device.

In one example, a first registration may also be assumed to be associated with an authorized mobile device, while a second registration that is received at a later time may be assumed to come from a potential cloned mobile device. For example, the present method may stop a cloned mobile device even before it is able to obtain network services. Thus, in one embodiment, all previous usage may be considered to be associated with the authorized mobile device. For instance, the last known location and trajectory associated with the telephone number/credentials may be assumed to be related to the authorized mobile device, where only the later second registration is subjected to analysis to determine whether the location from which the second registration is received matches potential locations of the authorized mobile device.

However, in another embodiment no priority is given to the order in which the registrations are received. For instance, a registration of a cloned mobile device may de-register an authorized mobile device, which may trigger the authorized mobile device to re-register. This may similarly de-register the cloned mobile device, which will attempt to re-register, and so on. Thus, it may not be apparent that an earlier registration is from the authorized mobile device.

Still another factor that may be used in calculating a fraud score may comprise a usage pattern associated with a location of a registration. For instance, both an authorized mobile device and a cloned mobile device may obtain services for a time prior to invocation of the present method. A historic usage pattern (e.g., going back several weeks or months) may be associated with the credentials (and is presumably generated in connection the authorized mobile device). In addition, short term usage patterns associated with the credentials may be tracked in connection with the first location and the second location and compared to the historic usage pattern. If the short term usage pattern is not similar to the historic usage pattern, the fraud score may be increased. Conversely, if the short term usage pattern matches or is similar to the historic usage pattern, the fraud score may not be increased or may be increased by only a small amount. It should be noted that the short term usage patterns are not necessarily limited to only a single registration (e.g., the first registration or the second registration), but may be collected over the course of minutes, hours or a single day and over the course of several registrations from each location. In addition, all usage and registrations in connection with the first location may be assumed to be associated with a first device, while all usage and registrations in connection with a second location may be assumed to be associated with a second device.

In one example, a level of matching between the short term usage pattern and the historic usage pattern is calculated. For instance, the historic and short term usage patterns may comprise a number of "sub-factors" such as: a volume of voice calls or an average number of voice calls per day, a volume or an average number of text messages per day, an average time spent on calls per day, an average time spent on each call, a volume of data usage per day, a ratio of voice calls to data calls, and so forth. The usage patterns may further comprise a geographic pattern of voice and/or data calls. For instance, for a user living in New York City, a historic calling pattern may indicate that the vast majority of calls are to New York City and surrounding areas, with a large number of calls also to San Francisco, where the user may have significant family or business interests. Thus, if a short term calling pattern primarily includes calls to or from these areas, this may fit within the historic usage pattern, while calls to other geographic areas do not. The historic calling pattern may also indicate significant usage only during the evenings and few or no international calls. Thus, a short term calling pattern with a large number of international calls or a large number of calls during morning and mid-day hours may not fit within the usage pattern.

In still another embodiment, the usage pattern may comprise a pattern of calls or text message to and from specific telephone numbers. For instance, for many users a substantial majority of all texts and voice calls involve only a handful of destination telephone numbers, e.g., close family, close friends, a place of work, and the like. Thus, a historic usage pattern may indicate only a handful of telephone numbers that comprise the vast majority of usage for a user. When a short term usage pattern associated with a location includes calls and messages to and from these same telephone numbers, the usage at that location is very likely to be from the legitimate device. If the short term calling pattern does not include calls and messages involving these telephone numbers, then the fraud score may be increased since the usage at this location is more likely to be from a cloned mobile device. As such, one or a plurality of "sub-factors", such as those describe above, may be analyzed to determine the similarity of the short term and historic usage patterns. For instance, the more "sub-factors" that match, the greater the similarity (and the less the fraud score will be increased).

At step 240, the processor determine which of the fraud scores is greater between the first fraud score for the first registration and the second fraud score for the second registration. For illustrative purposes, it is assumed that the second fraud score is the greater of the two fraud scores.

At step 250, the processor determines whether the greater of the two fraud scores (e.g., the second fraud score) exceeds a threshold fraud score. For example, even if the second fraud score may indicate that the second registration is more likely to be a cloned mobile device, if the fraud score is not significantly high, it could erroneously be processed as a false positive. For example, a legitimate user who is away at college may result in a high fraud score being assigned to the authorized device. Thus, in one example, a floor, or threshold fraud score, is implemented to separate fraud scores that are potentially subject to further action from those that will be ignored. Thus, in one embodiment, if the fraud score does not exceed this threshold, the method 200 proceeds from step 250 to step 295 where the method ends. Otherwise, the method 200 proceeds to step 255.

At step 255, the processor determines whether the difference between the greater of the two fraud scores and the lesser of the two fraud scores exceeds another threshold value. For instance, if a legitimate user is outside of his or her home area, it may be difficult to distinguish between a legitimate registration from an authorized mobile device and a fraudulent registration from a cloned mobile device. In particular, there is a potential for a registration from the authorized mobile device to be declared fraudulent if simply using the greater of the two fraud scores due to a variety of factors, such as the legitimate user using the phone in a manner that is different from a historical usage pattern, and so forth. Thus, when the difference between the two fraud scores does not exceed the threshold, the method 200 proceeds to step 295, where the method ends. Otherwise, the method proceeds to step 260.

At step 260, the registration with the greater fraud score is determined to be received from a cloned mobile device. In particular, the previous steps 250 and 255 are intended to avoid false detections of cloned mobile devices. However, it step 260 is reached, it is determined with a sufficient confidence that a cloned mobile device is involved. As such, the processor may implement corrective measures according to the subsequent steps of the method 200.

For example, at step 270, the processor may block the cloned mobile device from registering and obtaining network services. For instance, if the authorized mobile device is registered and the second registration is received from the cloned mobile device at a later time, the processor may notify one or more other network devices to decline the second registration. Thus, the blocking comprises refusing to establish communications for the cloned mobile device at a RNC, MSC, SGSN, or S-CSCF or other network element that is associated with the second location.

In one example, the cloned mobile device may be registered and receiving services at the time that it is determined to be the cloned mobile device. Thus, services for the cloned mobile device may be terminated and the legitimate device may instead be registered. For instance, an entry in a HLR may be corrected to indicate the correct VLR that is servicing the authorized mobile device. Similar, an entry in an HSS of the home area may be updated to note the correct current HSS for servicing the authorized mobile device in an area in which the authorized mobile device is located, e.g., with respect to 4G/IMS services. Thus, incoming calls that trigger a query to a HLR or "home" HSS may be properly routed to the authorized mobile device. For example, if the authorized mobile device comprises mobile device 102 in FIG. 1 and the cloned mobile device comprises mobile device 104, after the HSS and/or HLR is corrected, calls from other devices such as mobile device 106 and endpoint devices 182, 184A, 186A, 184B, 186B, 184C, and 186C may be properly routed for mobile device 102. An entry in the HSS and/or VLR for the cloned mobile device may also be removed (where the entry includes the credentials comprising the at least one device identifier and the telephone number).

The cloned mobile device may also be blacklisted at a VLR and/or HSS from which it was previously being served. For example, by refusing to provide an entry using these credentials at a VLR or HSS that is assigned to a particular area or region, MSCs, SGSNs, and S-CSCFs, and the like within the same portion of a network may decline to establish communications for the cloned mobile device in the event it attempts to re-register with the network. It should be noted that the blacklisting may involve the same credentials that are used by the legitimate device. Consequently, the legitimate device may also be prevented from obtaining services in the area of the cloned mobile device. As such, in one embodiment the blacklisting may be implemented for only a certain period of time, e.g., two weeks, one month, and so forth, after which the credentials may again be used to register a mobile device in the area.

In one example, step 270 may further include correcting a telephone number mapping database, e.g., an E.164 database or ENUM database. For instance, one or more NAPTRs may be associated with the telephone number and comprise SIP URIs, which may correspond to a SIP address, a telephone number, a presence service number, an email address, etc. In one example, when a mobile device registers throughout a network and in different locations, it may be assigned different IP addresses. Thus, if a cloned mobile device is registered, the ENUM database may include an NAPTR record that will resolve to a particular IP address that bears some relation to the location from which the cloned mobile device registered with the network. Thus, when registering the authorized mobile device and blocking the cloned mobile device, at least one NAPTR record may be updated to reflect the IP address assigned to the authorized mobile device.

In addition, the fraudulent user may have added or changed NAPTR records associated with the telephone number. For instance, the fraudulent user could have included an NAPTR with a SIP URI that will resolve to a foreign IP address/destination. For instance, instead of routing incoming calls to the cloned mobile device via the cellular network, the SIP URI could resolve to a destination address that results in toll charges, where such charges may be borne by the legitimate user and/or by the network operator. Thus, such entries may further be corrected and/or deleted at step 270. Accordingly, if the authorized mobile device comprises mobile device 102 in FIG. 1 and the cloned mobile device comprises mobile device 104, after NAPTR records are corrected, calls from other devices such as mobile device 106 and endpoint devices 102, 184A, 186A, 184B, 186B, 184C, 186C may be properly routed to mobile device 102, or an alternative location accordance with the legitimate user's preferred routing.

At step 280, the processor may cause one or more billing entries, e.g., usage charge, associated with usage by the cloned mobile device to be removed from a bill for the legitimate user. For instance, usage associated with the second location may be flagged and all charges relating to such usage may be removed from the bill. In this regard, the processor may send instructions to a billing server, billing system or similar network component to effect the removal of such billing entries.

At step 290, the processor may also transmit a message to the non-cloned/authorized mobile device. For example, a text message/short message service (SMS) message, an email, an automated voicemail message, or the like may be directed to the non-cloned mobile device and/or to the user to notify the user that the credentials have been detected as being cloned. The message may further request that the authorized mobile device be brought to the network operator for servicing, e.g., to replace the SIM card and/or to otherwise change one or more of the device identifiers, to receive a new identical device, a different type of device, and so forth.

Following step 290, the method 200 proceeds to step 295 where the method ends.

In addition, although not specifically specified, one or more steps, functions or operations of the methods 200 may include a storing, displaying and/or outputting step as required for a particular application. In other words, any data, records, fields, and/or intermediate results discussed in the method can be stored, displayed and/or outputted either on the device executing the method 200, or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. In addition, one or more steps, blocks, functions or operations of the above described method 200 may comprise optional steps, or can be combined, separated, and/or performed in a different order from that described above, without departing from the example embodiments of the present disclosure.

As such, the present disclosure provides at least one advancement in the technical field of detecting and blocking unauthorized usage in a cellular network. This advancement is in addition to the traditional detection of fraudulent usage where a legitimate subscriber detects problems with the network service, calls the network operator and triggers a manual investigation of the cause of service disruption, which may eventually be traced to usage by a cloned mobile device. Viewed in another manner, the present disclosure enables automatic detection of fraudulent usage by a cloned mobile device, even in the absence of the legitimate subscriber detecting service problems through the use of device location tracking, travel speed calculations and historic usage tracking in conjunction with known billing address, asserted home address, and current usage information.

The present disclosure also provides a transformation of data, e.g., device location tracking, travel speed calculations and historic usage tracking data as well as known billing address, asserted home address, and/or current usage information data are transformed into weighted factors and fraud scores, which are compared for registrations from different locations to determine that one of two registrations is associated with a cloned mobile device.

Finally, embodiments of the present disclosure improve the functioning of a computing device, e.g., a server. Namely, a server for blocking a cloned mobile device is improved by utilizing the weighted factors and fraud score data to provide a more robust cloned mobile device blocking method.

Figure 3:
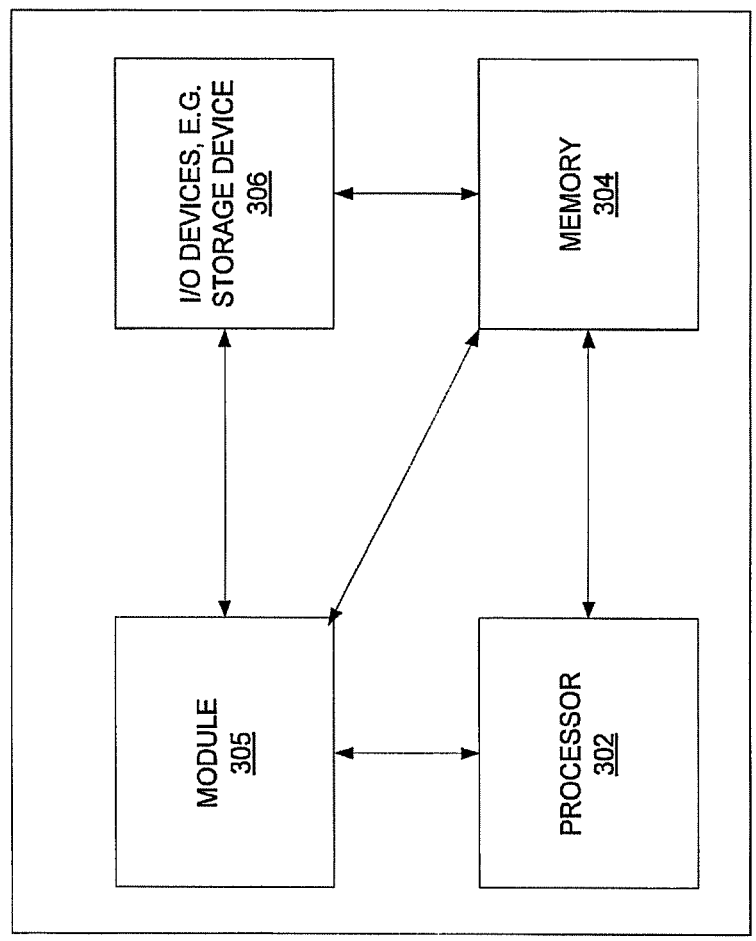
FIG. 3 illustrates a high-level block diagram of a computing device suitable for use in performing the functions, methods, operations and algorithms described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for blocking a cloned mobile device, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 305 for blocking a cloned mobile device (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for blocking a cloned mobile device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for blocking a cloned mobile device, the method comprising:
   receiving, by a processor of a network, a first registration from a first mobile device at a first location, wherein the first registration includes a device identifier and a phone number;
   confirming, by the processor, that a second registration from a second mobile device at a second location includes the device identifier and the phone number;
   calculating, by the processor, a first fraud score for the first mobile device and a second fraud score for the second mobile device;
   determining, by the processor, the second mobile device is the cloned mobile device, when the second fraud score exceeds the first fraud score;
   blocking the cloned mobile device from registering on the network; and
   transmitting a message to the first mobile device notifying that a usage of the cloned mobile device has been detected and requesting that a subscriber identity module of the first mobile device be replaced.

2. The method of claim 1, wherein the determining the second mobile device is the cloned mobile device comprises determining that the second fraud score exceeds the first fraud score and that the second fraud score further exceeds a threshold fraud score.

3. The method of claim 1, wherein the determining the second mobile device is the cloned mobile device comprises determining that the second fraud score exceeds the first fraud score and that a difference between the second fraud score and the first fraud score exceeds a threshold amount.

4. The method of claim 1, wherein the calculating comprises:
   calculating a first distance from the first location to a home location associated with the phone number; and
   calculating a second distance from the second location to the home location associated with the phone number, wherein the first fraud score is based upon the first distance and the second fraud score is based upon the second distance.

5. The method of claim 1, wherein the calculating comprises:
   calculating a first distance from the first location to a location of a previous usage associated with the phone number; and
   calculating a second distance from the second location to the location of the previous usage associated with the phone number, wherein the first fraud score is based upon the first distance and the second fraud score is based upon the second distance.

6. The method of claim 5, wherein the first registration is received prior to the second registration, wherein the calculating comprises:
   calculating a plurality of potential locations for the first mobile device based upon a trajectory of the first mobile device; and
   comparing the second location to the plurality of potential locations for the first mobile device based upon the trajectory, wherein the second fraud score is based upon whether the second location comprises one of the plurality of potential locations.

7. The method of claim 1, wherein the calculating comprises:
   calculating a first level of matching between a first usage pattern associated with the first location and a previous usage pattern associated with the phone number; and
   calculating a second level of matching between a second usage pattern associated with the second location and the previous usage pattern associated with the phone number, wherein the first fraud score is based upon the first level of matching and the second fraud score is based upon the second level of matching.

8. The method of claim 7, wherein the first usage pattern and the second usage pattern each comprises a number of calls to a particular region.

9. The method of claim 7, wherein the first usage pattern and the second usage pattern each comprises a volume of calls.

10. The method of claim 7, wherein the first usage pattern and the second usage pattern each comprises a ratio of voice calls to data calls.

11. The method of claim 1, further comprising:
   removing billing entries associated with the cloned mobile device from a bill associated with the phone number.

12. The method of claim 1, wherein the blocking comprises refusing to establish communications for the cloned mobile device at a mobile switching center of the network that is associated with the second location.

13. The method of claim 1, wherein the blocking comprises:
   removing an entry associated with the device identifier and the phone number from a visiting location register associated with the second location; and
   preventing re-registration of the device identifier and the phone number at the visiting location register associated with the second location.

14. The method of claim 1, wherein the blocking comprises correcting an entry associated with the phone number in a home location register or a home subscriber server to associate the phone number with the first location.

15. The method of claim 1, wherein the device identifier comprises at least one of:
   an electronic serial number;
   a mobile equipment identifier;
   an integrated circuit card identifier;
   an international mobile equipment identity; or
   an international mobile subscriber identity.

16. A non-transitory computer readable medium storing a plurality of instructions which, when executed by a processor of a network, cause the processor to perform operations for blocking a cloned mobile device, the operations comprising:

receiving a first registration from a first mobile device at a first location, wherein the first registration includes a device identifier and a phone number;

confirming that a second registration from a second mobile device at a second location includes the device identifier and the phone number;

calculating a first fraud score for the first mobile device and a second fraud score for the second mobile device;

determining that the second mobile device is the cloned mobile device, when the second fraud score exceeds the first score;

blocking the cloned mobile device from registering on the network; and transmitting a message to the first mobile device notifying that a usage of the cloned mobile device has been detected and requesting that a subscriber identity module of the first mobile device be replaced.

17. An apparatus for blocking a cloned mobile device, the apparatus comprising:

a processor of a network; and a computer-readable medium storing instructions which, when executed by the processor, cause the processor to perform operations, the operations comprising:

receiving a first registration from a first mobile device at a first location, wherein the first registration includes a device identifier and a phone number;

confirming that a second registration from a second mobile device at a second location includes the device identifier and the phone number;

calculating a first fraud score for the first mobile device and a second fraud score for the second mobile device;

determining that the second mobile device is the cloned mobile device, when the second fraud score exceeds the first score;

blocking the cloned mobile device from registering on the network; and transmitting a message to the first mobile device notifying that a usage of the cloned mobile device has been detected and requesting that a subscriber identity module of the first mobile device be replaced.

18. The apparatus of claim 17, wherein the determining the second mobile device is the cloned mobile device comprises determining that the second fraud score exceeds the first fraud score and that the second fraud score further exceeds a threshold fraud score.

19. The apparatus of claim 17, wherein the determining the second mobile device is the cloned mobile device comprises determining that the second fraud score exceeds the first fraud score and that a difference between the second fraud score and the first fraud score exceeds a threshold amount.

20. The apparatus of claim 17, wherein the calculating comprises:

calculating a first distance from the first location to a home location associated with the phone number; and calculating a second distance from the second location to the home location associated with the phone number, wherein the first fraud score is based upon the first distance and the second fraud score is based upon the second distance.

* * * * *